Oct. 16, 1956  W. B. FAHRENBACH ET AL  2,766,567
MACHINE FOR FORMING CARRIERS FOR RECTANGULAR MILK CARTONS
AND METHOD OF PACKAGING SUCH CARTONS IN PAIRS
Filed Oct. 15, 1951  7 Sheets-Sheet 1
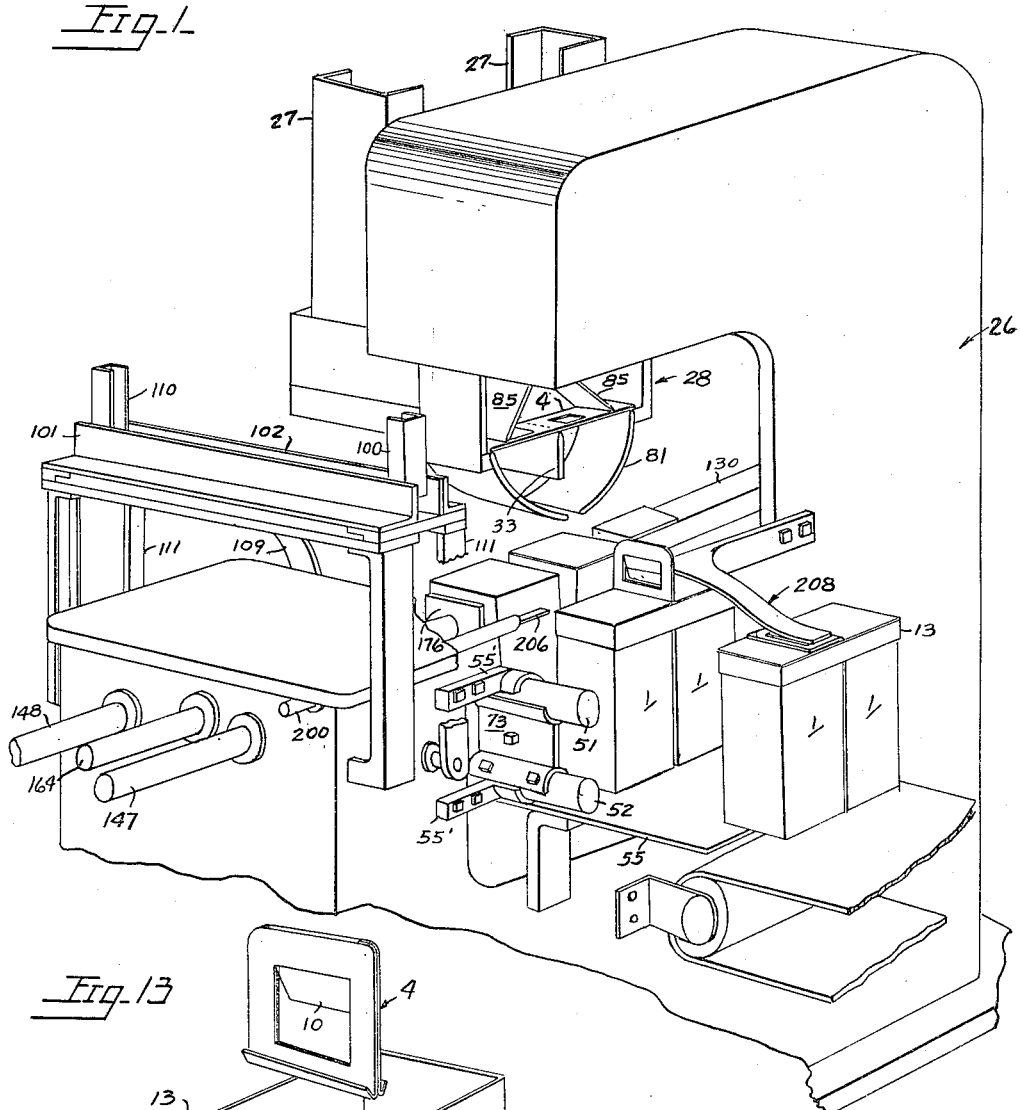
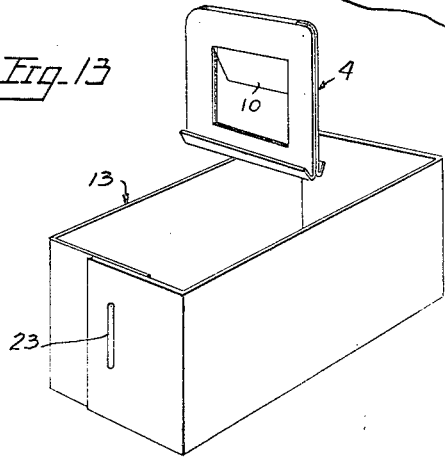
INVENTORS
WOLFGANG B. FAHRENBACH
FLOYD B. STONE
BY
Boyken, Mohler & Beckley
ATTORNEYS.

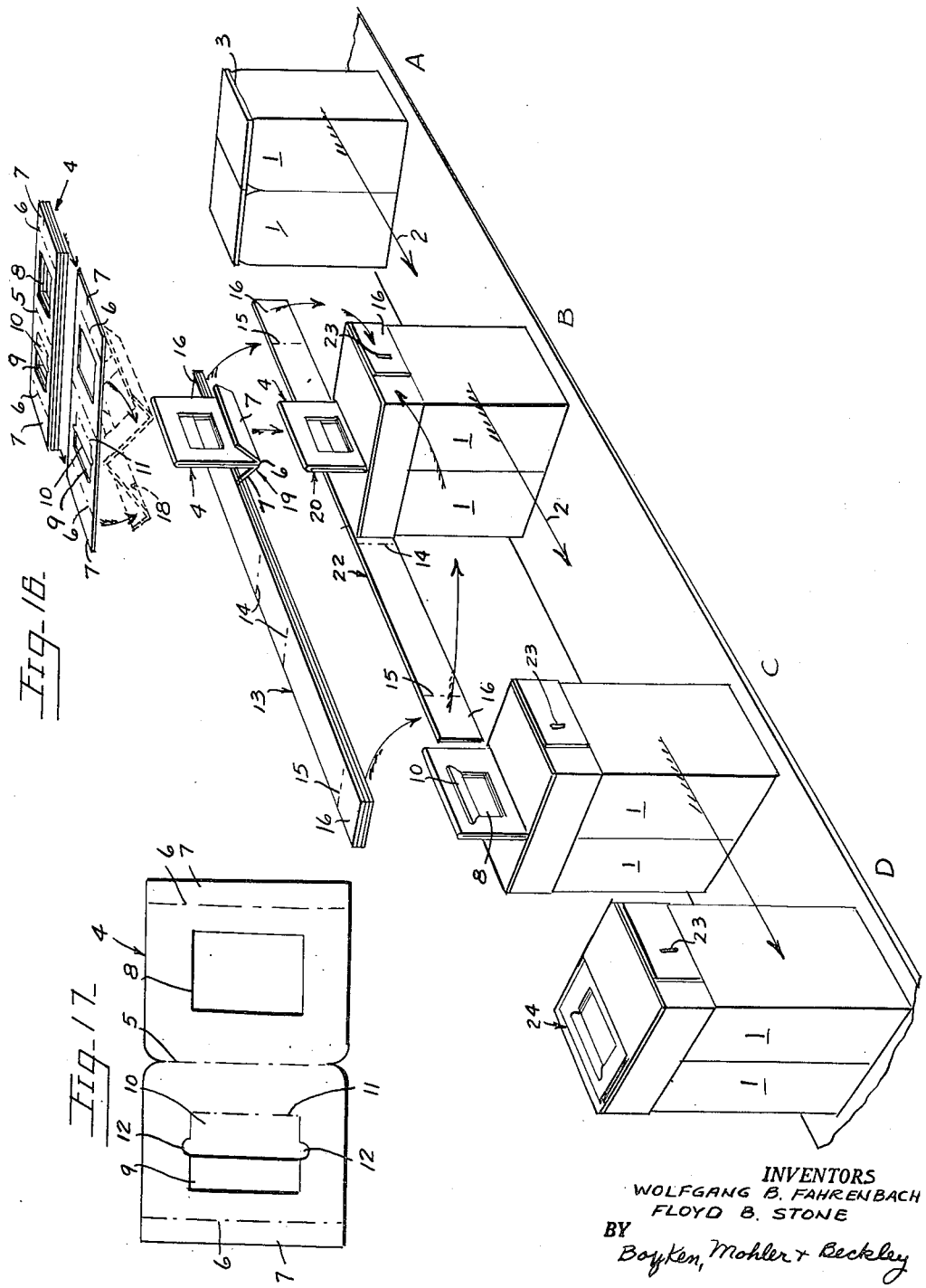

Oct. 16, 1956 W. B. FAHRENBACH ET AL 2,766,567
MACHINE FOR FORMING CARRIERS FOR RECTANGULAR MILK CARTONS
AND METHOD OF PACKAGING SUCH CARTONS IN PAIRS
Filed Oct. 15, 1951 7 Sheets-Sheet 3
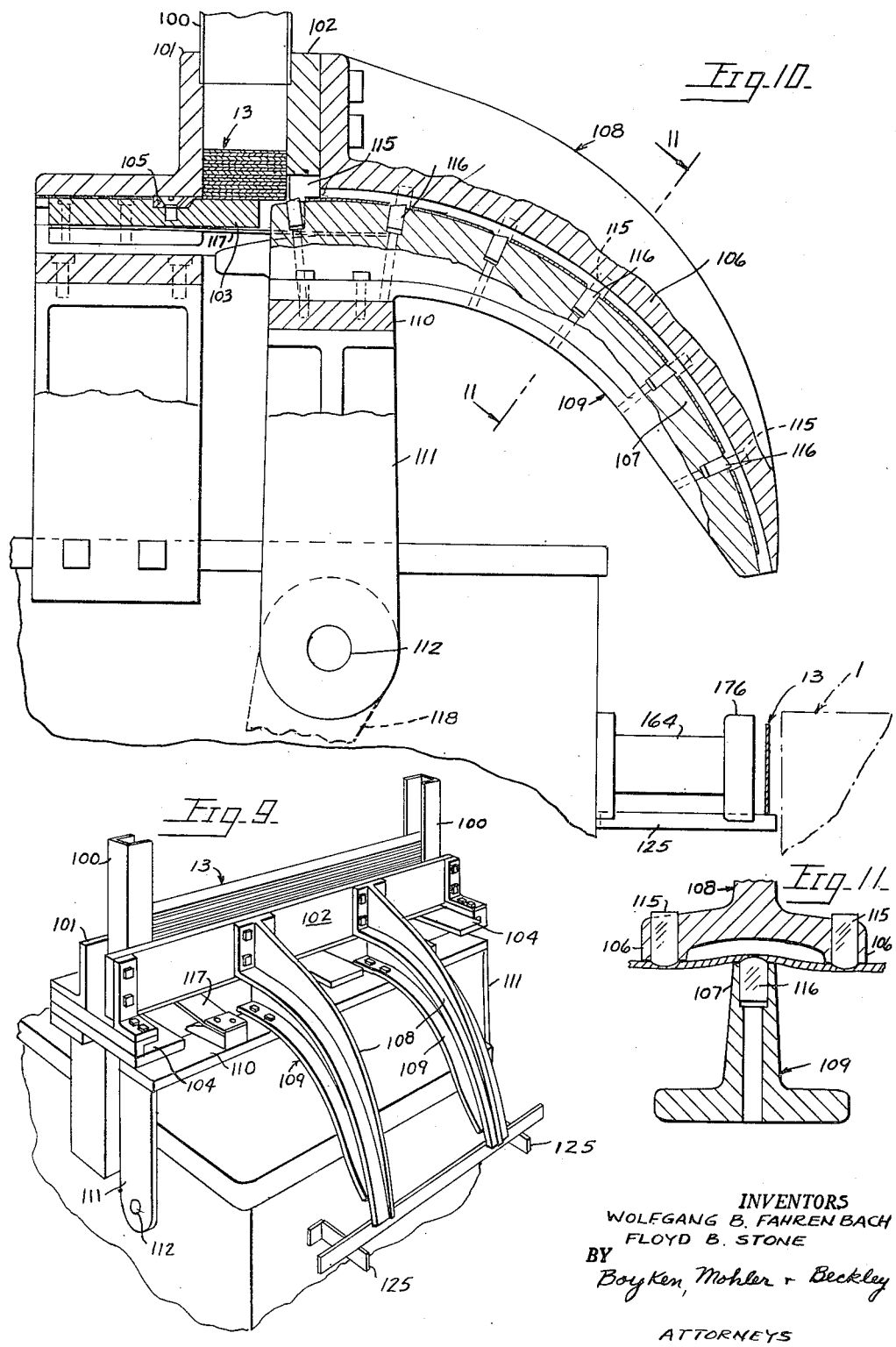
INVENTORS
WOLFGANG B. FAHRENBACH
FLOYD B. STONE
BY
Boyken, Mohler + Beckley
ATTORNEYS

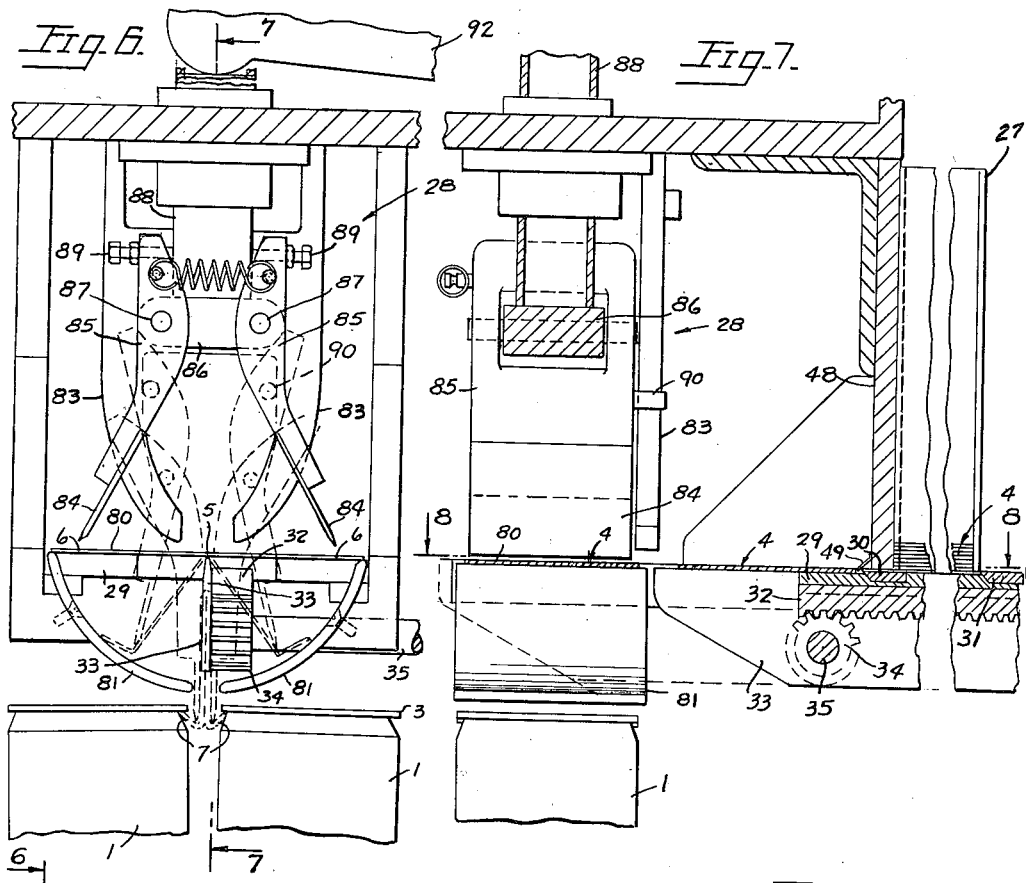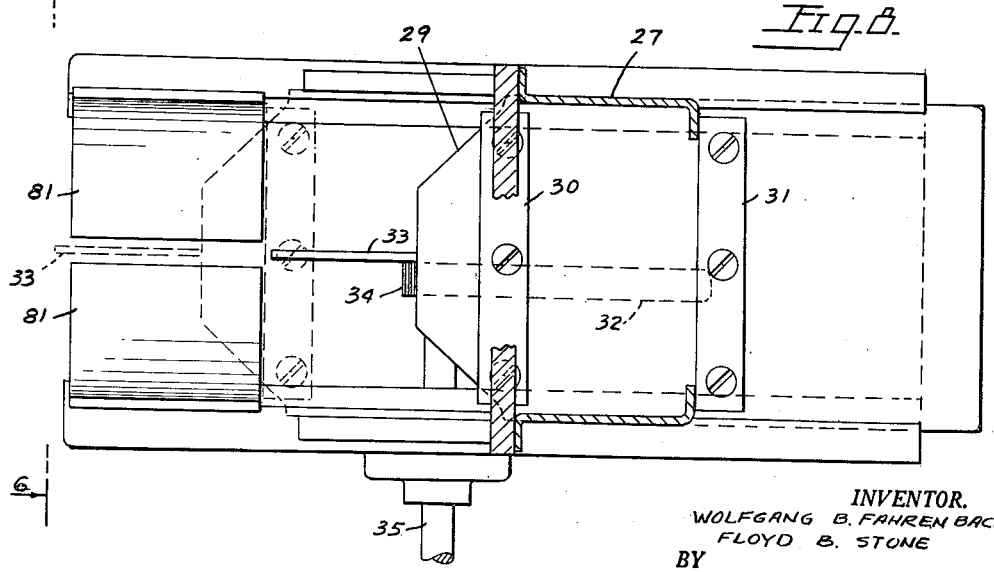

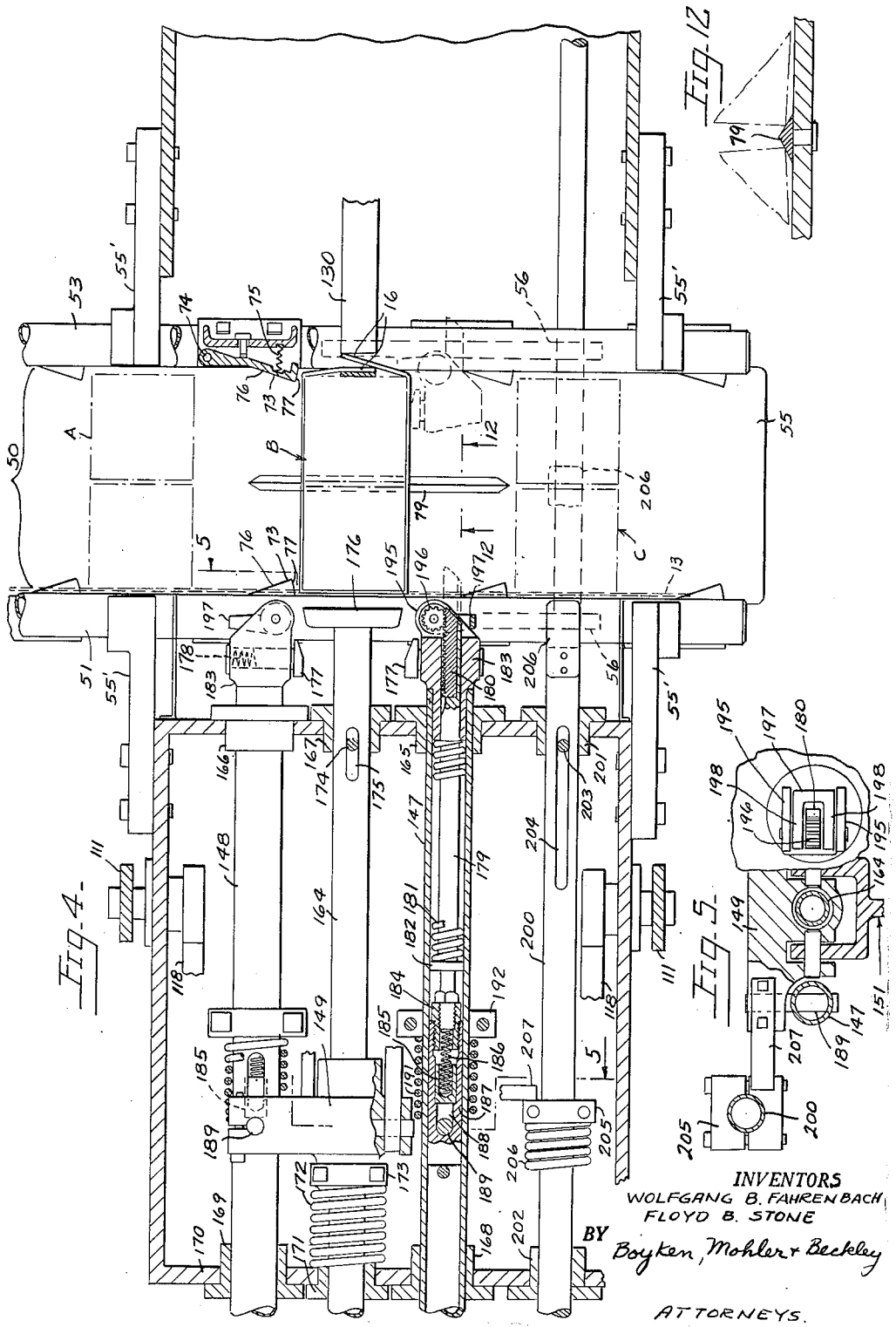

Oct. 16, 1956 W. B. FAHRENBACH ET AL 2,766,567
MACHINE FOR FORMING CARRIERS FOR RECTANGULAR MILK CARTONS
AND METHOD OF PACKAGING SUCH CARTONS IN PAIRS
Filed Oct. 15, 1951 7 Sheets-Sheet 6
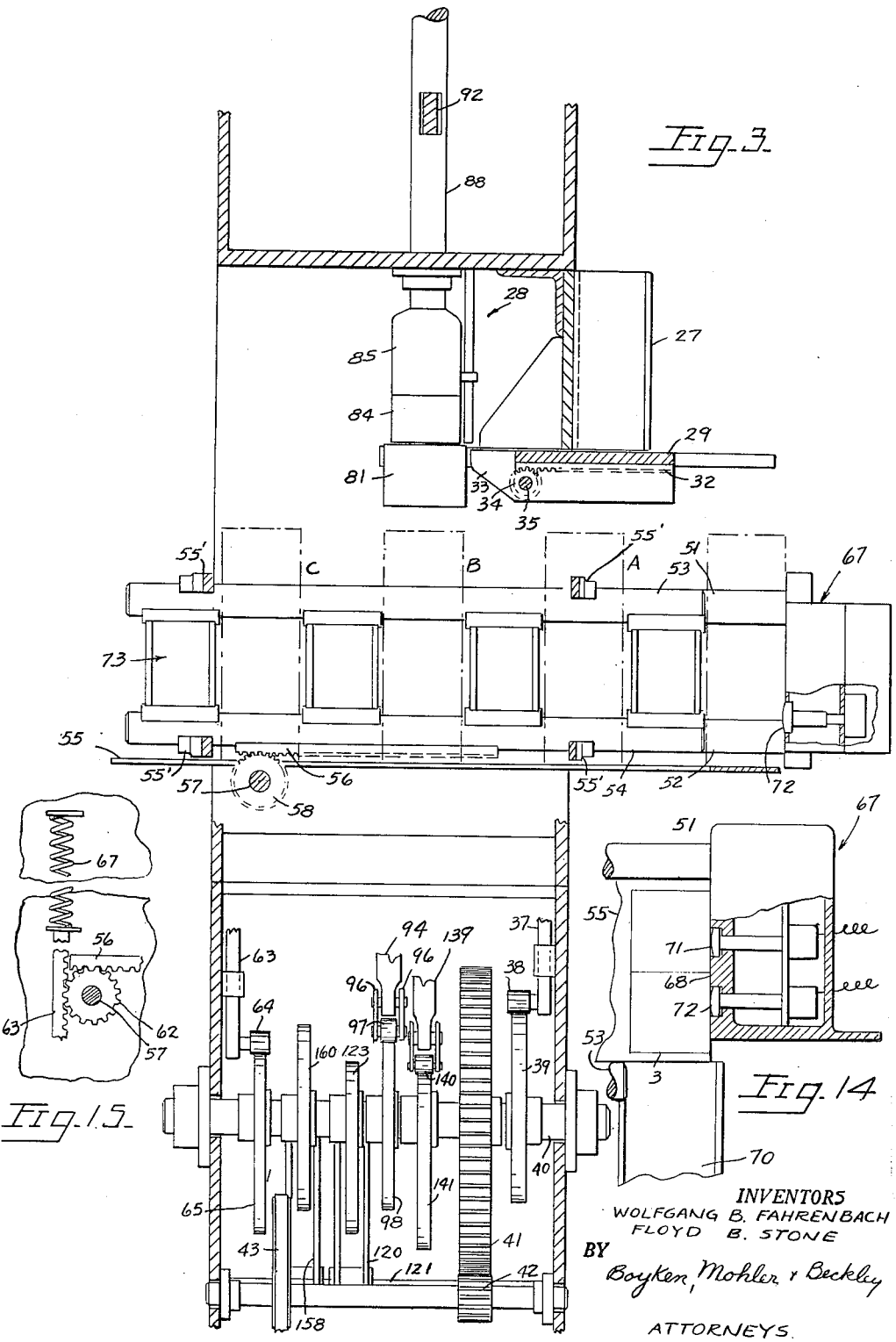
INVENTORS
WOLFGANG B. FAHRENBACH
FLOYD B. STONE
BY
Boyken, Mohler & Beckley
ATTORNEYS.

Oct. 16, 1956 W. B. FAHRENBACH ET AL 2,766,567
MACHINE FOR FORMING CARRIERS FOR RECTANGULAR MILK CARTONS
AND METHOD OF PACKAGING SUCH CARTONS IN PAIRS
Filed Oct. 15, 1951 7 Sheets-Sheet 7

INVENTOR.
WOLFGANG B. FAHRENBACH
FLOYD B. STONE
BY
Boyken, Mohler + Beckley

ATTORNEYS.

United States Patent Office 2,766,567
Patented Oct. 16, 1956

2,766,567

MACHINE FOR FORMING CARRIERS FOR RECTANGULAR MILK CARTONS AND METHOD OF PACKAGING SUCH CARTONS IN PAIRS

Wolfgang B. Fahrenbach, Oakland, and Floyd B. Stone, San Anselmo, Calif., assignors to Edlo, Inc., San Francisco, Calif., a corporation of California Application October 15, 1951, Serial No. 251,404

13 Claims. (Cl. 53—3)

This invention relates to a machine for forming carriers for rectangular milk cartons and to a method of packaging such cartons in pairs.

Milk cartons of one type are rectangular and vertically elongated and have flat upper ends with a bead or horizontal flange around the upper end of each carton, the outer edge of which is coplanar with the sides of the carton.

In copending application for United States Letters Patent, Serial No. 217,820, filed March 27, 1951, by Platt and Cavalli, now U. S. Patent No. 2,696,400, several carriers are illustrated for securing a pair of the above type of cartons together for carrying as a unit. In general, such a carrier comprises a rectangular collar that extends around a pair of cartons and an upstanding handle between said pair, with means on the handle engaging below the adjacent flanges at the upper ends of the cartons.

The problem of securing such a carrier to the cartons by hand is a simple matter, but due to labor costs and the slowness of such a method, the expense is excessively high, and as such expense must be absorbed by the creamery, the public is in many instances deprived of the benefits resulting from the use of such carriers due to the inability of the creamery to absorb such added costs.

One of the objects of the present invention is the provision of a machine that is adapted to secure a carrier to a pair of milk cartons in a rapid and reliable manner.

Another object is an improved method of securing a collar and handle to a pair of milk cartons to provide a carrier for such milk.

In the problem of securing a carrier to milk cartons, it is essential that the carrier be cheap to make, and the cheapest material is cardboard. Cardboard is readily cut to the desired shape, is easily bent and printing can be put on it by conventional presses. However, in use on milk cartons, the use of glue or cement is not satisfactory because the cartons are at one time or another stored where it is damp and the glue or cement becomes loosened. The use of locking tabs, while providing good securement, is not suitable for reliable and fast machine operation. The securement of the collar around the cartons by stapling it together makes a secure joint under any conditions, where the use of glue or cement is undesirable, and one of the objects of the invention is the provision of means for stapling the ends of a collar together with the collar in a position tightly embracing a pair of cartons and also the provision of means for inserting a handle between the pair of cartons.

A still further object of the invention is the provision of a machine that is adapted to form a collar and a handle from blanked cardboard material and to secure such collar tightly around a pair of cartons and to also insert the handle between such pair in which the handle is of the type having means to prevent its withdrawal unless the collar is broken so that the pair of cartons can be carried by the handle until the collar is removed.

Other objects and advantages will appear in the description and in the drawings.

In the drawings,

Fig. 1 is an isometric view (partly broken away) of the machine of this invention, several pairs of milk cartons being shown in position on the machine.

Fig. 3 is a sectional view taken substantially along line 3—3 of Fig. 2.

Fig. 4 is an enlarged horizontal part sectional and part elevational view taken substantially along line 4—4 of Fig. 2, but with the collar stapling means in about stapling position.

Fig. 5 is a cross sectional view taken along line 5—5 of Fig. 4.

Fig. 6 is an enlarged part sectional and part elevational view of the handle folding and inserting portion of the machine.

Fig. 7 is a sectional view taken substantially along line 7—7 of Fig. 6.

Fig. 8 is a sectional view taken along line 8—8 of Fig. 7.

Fig. 9 is a fragmentary perspective view of a portion of the machine that delivers the unfolded collar for folding around a pair of cartons.

Fig. 10 is an enlarged vertical cross sectional view taken through the collar delivery portion of the machine.

Fig. 11 is a fragmentary sectional view taken along line 11—11 of Fig. 10.

Fig. 12 is a fragmentary enlarged sectional view taken along line 12—12 of Fig. 4.

Fig. 13 is a perspective view of a collar and handle separate from the machine and cartons in finally folded condition.

Fig. 14 is a fragmentary part elevational and part sectional plan view of the carton feed portion of the machine.

Fig. 15 is a fragmentary view showing the rack and pinion drive connection for operating the carton feeding and moving device.

Fig. 16 is a diagrammatic view showing the method of forming the unitary package of two cartons of milk with the handle in position, independently of any machine for practicing the method, but which steps are those the machine that is shown is adapted to perform.

Fig. 17 is a plan view of the blank from which the handle of the carrier is formed.

Figure 2:
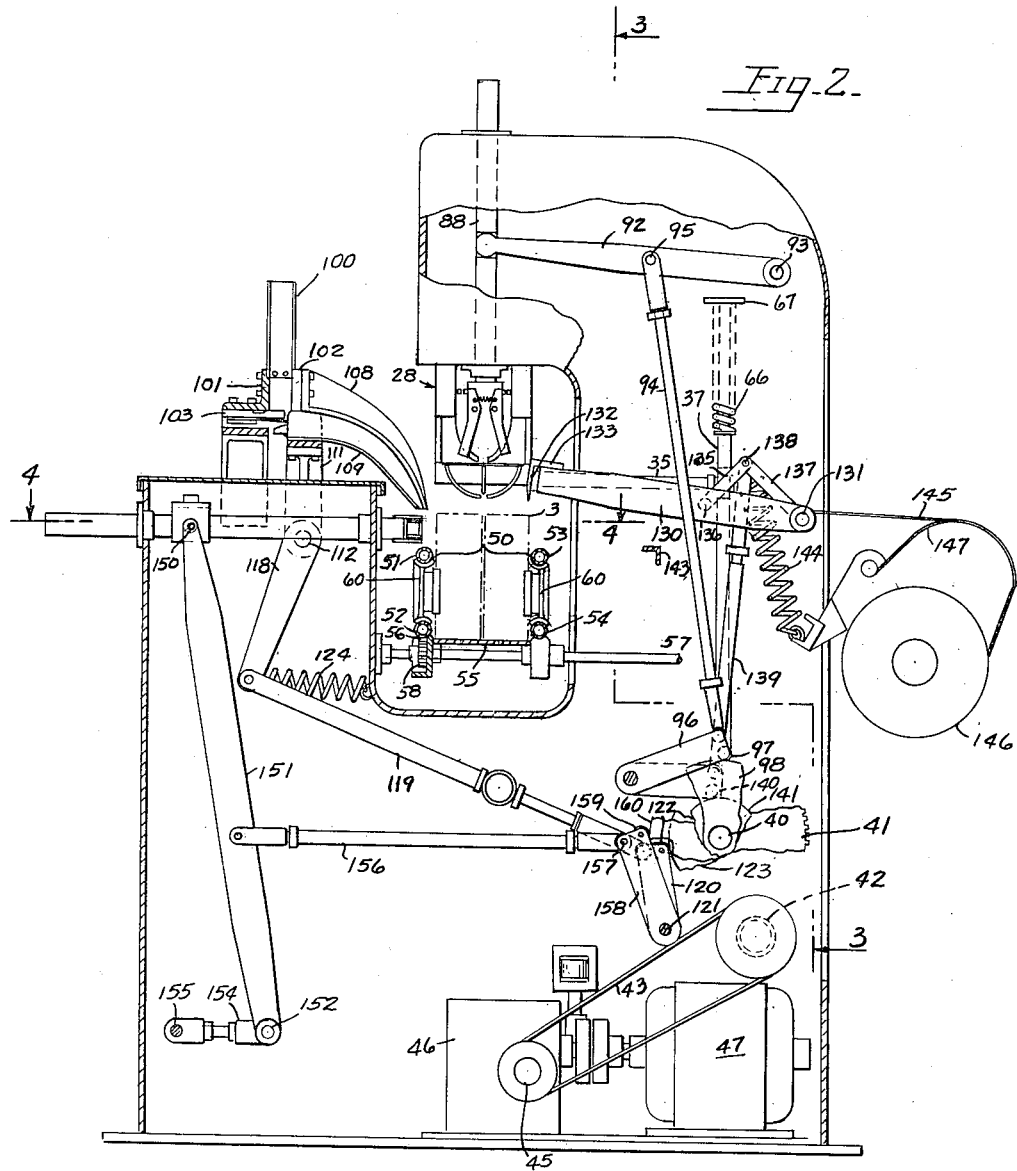
Fig. 2 is a part sectional and part elevational view of the machine of Fig. 1 as seen from the near side of Fig. 1.

Before describing the machine in detail, the steps that the machine is adapted to perform will first be described, reference being made to Fig. 16.

The filled cartons 1 are delivered in pairs for securing together, two such cartons being seen at the right hand end of the path of travel of said cartons along a straight path indicated by the arrows 2 (Fig. 16).

These cartons 1 are of the conventional flat topped type (as distinguished from gable roof type cartons) and each has a horizontally disposed flange 3 around the top. These flanges are substantially coplanar with the sides of the carton that are below the flanges, hence when the cartons are in side by side engaging relationship as seen in Fig. 14 the edges of the adjacent flanges 3 as well as the adjacent sides of the cartons will be in substantial engagement. This very fact creates a problem, because the handle must be positioned between said substantially engaging edges. The problem is solved in the present invention, as will later be described.

At an elevated level above the path in which the cartons move, is a supply of flat handles 4, in a stack, and which handles have been merely blanked or stamped from cardboard. The blanks in said stack are elongated and extend transversely of the path of travel of the cartons 1.

Each blank 4 (Fig. 17) is formed with a central folding crease 5 extending perpendicularly of the length of the blank across the latter, and folding creases 6 parallel with crease 5 are at opposite ends of the blank and equally spaced from the ends, defining one edge of a marginal portion 7 at each end of the blank.

At opposite sides of the central folding crease 5 a pair of hand openings 8, 9 are formed, said openings being of the same size and adapted to register with each other when the blank is folded on itself along the folding crease 5. However, all of the stock of the blank in opening 9 is not fully stamped out, but a portion 10 remains connected with the blank along a folding crease 11 that is parallel with and at the end of the opening 9 that is adjacent to folding crease 5. At the ends of the opposite edge of portion 10 that is parallel with folding crease 11 are a pair of tabs 12 opposite outward extensions of said opposite edge.

At one side of said path of travel of cartons 1 is a stack of cardboard blanks 13 that are adapted to form the collar of the carrier, and that secure the cartons together. These strips extend longitudinally of the path of travel of said cartons.

Each of the strips 13 is formed with a pair of central transverse folding creases 14 that are spaced apart the width of one of the cartons 1, and folding creases 15 are spaced equally and oppositely outwardly from the pair of creases 14 a distance equal to twice the width of the pair of cartons 1. The opposite end portions 16 at the ends of strip 13 are less than the width of a carton in length but greater than half such width.

The pair of cartons 1 are moved in side by side relationship along path of travel 2 from the station A (at right end of path as seen in Fig. 16) to station B. When the pair arrives at station B, one of the handle blanks 4 is moved from the stack over the cartons at said station and then downwardly, and as it is moved downwardly the halves at opposite sides of the crease 5 are bent downwardly as in dotted line position 18 (Fig. 16) and the end portions 7 are bent oppositely outwardly and upwardly. The said halves are brought fully together as in full line position 19 when the leading lower edge of the blank along folding creases 6 will be above and parallel with the adjacent edges of the flanges 3 of the cartons therebelow at station B.

The upper ends of said cartons at station B are swung slightly apart and the folded handle is thrust downwardly into the space between said ends until the oppositely outwardly and upwardly projecting marginal portions 7 of said handle are below the adjacent flanges 3. The handle will then be in position 20 seen in full line at station B in Fig. 16.

One of the strips 13 is moved to a position 22 alongside station B and parallel with the path of travel of the cartons at an elevation that is even with the upper marginal portions of cartons 1. When strip 13 is in position 22 the flat side of the strip faces the side of the carton 1 that is adjacent thereto, and the portion of said strip between creases 14 is directly opposite said side of the carton 1. The portions of strip 13 at position 22 that are outwardly of creases 14 are then bent along said creases to extend across the opposite sides of the faces of the pair of cartons at station B, and then the ends 16 are overlapped at the side of carton 1 that is most remote from the strip at position 22.

This folding of the strip 13 forms a rectangular collar, and it is drawn tightly around the pair of cartons thus bringing the upper ends of the cartons 1 at station B tightly against the handle that is therebetween, and said end portions 16 are then stapled together by a staple 23.

After the above operation is completed, the cartons are held together as a unit, and the handle 4 cannot be withdrawn until the collar is broken or removed because the marginal portions 7 on the handle are engaged below the adjacent flanges 3 of the cartons. The more force that is applied to the handle to withdraw it, the tighter the cartons will be pressed against the ends of the collar.

The pair of cartons so secured together can be removed from path 2 for packing and shipping, if desired, but preferably they are moved to station C along said path where the portion 10 in opening 9 of the handle is swung about crease 11 through the opening 8. Tabs 12 will spring over the opposite lateral edges of opening 8 so the portion 10 will be held in a position extending across the upper edge of opening 8 thereby providing a comfortable covering for the said edge.

The cartons may next be moved along said path to station D, and for removal from said path, and as they are so moved the upstanding part of the handle that projects upwardly from between the pair of cartons may be bent down at station D to position 24 (Fig. 16) to be flat against the top of one of the pairs of cartons so as to enable stacking the cartons and to keep it from being injured.

The foregoing description describes the steps that the machine is adapted to accomplish automatically and in the desired order substantially as described. Some of the steps, such as folding and inserting the handle and folding and stapling the collar are done practically simultaneously.

In the machine, substantially the same relationship between the handle blanks and the collar blanks, and the cartons is maintained as shown in Fig. 16 which will simplify the description of the machine.

The machine for forming and placing the handles and collars on the pairs of cartons 1 comprises a rigid frame 26 (Fig. 1) that carries spaced opposed vertically extending channel members 27 providing a magazine for the stack of horizontally disposed, flat handles 4 that are indicated in Figs. 7, 16.

The magazine for blanks 4 is alongside a folding mechanism generally designated 28 (Figs. 6, 7) below which the lowermost blank in the magazine is adapted to be laterally moved so that said blank will extend transversely above the path of travel of the cartons 1 therebelow. Said folding mechanism is at a position corresponding to station B in Fig. 16.

The means for moving the lowermost handle blank from the magazine 27 is a horizontal reciprocably mounted feeder plate 29 supported for horizontal reciprocable movement generally toward the folding mechanism 28. This feeder plate has a pair of parallel strips 30, 31 extending thereacross longitudinally of the blanks 4, and transversely of the movement of the feeder plate. The strips 30, 31 are secured to said plate 29 for movement therewith, and strip 30 is in the leading position with its leading edge (during movement toward the folding mechanism) free for engagement with one of the longitudinally extending edges of a blank 4. The thickness of strip 30 projecting above the portion of plate 29 between it and the folding mechanism is substantially equal to the thickness of a blank 4, the lattter being preferably of cardboard, as is collar 13. Strip 31 is spaced from strip 30 a distance slightly greater than the width of a handle blank 4 and is elevated above the level of strip 30 a distance equal to the thickness of such blank.

A rack 32 is secured to the underside of plate 29 alongside a vertically disposed horizontally extending rib 33 (Figs. 7, 8), the latter being centrally below said plate and extending longitudinally thereof and of the direction of travel of said plate.

The forward end of rib 33, or the end adjacent to the folding mechanism, projects from the plate 29 and from the terminating end of rack 32, and its upper surface is even with the upper surface of plate 29.

A pinion 34 on a shaft 35 has its teeth in mesh with the teeth of rack 32, so that upon rotation of shaft 35 in one direction and then the other, the plate 29 and the strips thereon will be reciprocated backwards and forward relative to the folding mechanism 29.

This reciprocation is effected by means of a pinion 36 on the end of shaft 35 that is opposite pinion 34 (Fig. 2). The pinion 36 has its teeth in mesh with the teeth of a vertically extending rack 37, the lower end of which carries a cam follower 38 (Fig. 3) in engagement with a cam 39 that is secured on a shaft 40, which shaft 40, in turn is driven by a gear and pinion connection 41, 42 and belt 43 with the driven shaft 45 (Fig. 2) of a gear box 46. Motor 47 has a driving connection with the gear box.

The strip 30 is positioned at about the lower edge of the forward wall 38 of the magazine for the handle blanks (Fig. 7) while strip 31 is at about the rear side of the magazine, when the rack 32 is at the rear end of its stroke (away from the folding mechanism). Upon the initial stroke toward the folding mechanism, the lowermost blank 4 in the stack will be moved by strip 31 through the slot or space below wall 48 and plate 29 until the strip clears said wall, at which time one or more spring fingers 49 secured to the face of said wall will prevent retraction of the blank when the plate moves back so that strip 31 can engage another blank. Upon such retraction the previously removed blank will be engaged by the strip 30 on plate 29 so that on the next movement of plate 29 toward the folding mechanism the blank 4 that had previously been moved toward the folding mechanism will be moved to a position in said folding mechanism for folding to form the handle. Thus, after the initial reciprocating cycle of strips 30, 31 two blanks 4 will be simultaneously moved toward the folding mechanism, one of which will be moved into the folding mechanism.

As will later be described, the rib 33 that also reciprocates with plate 29 has a function to perform in the folding operation. As already explained, this rib projects from the plate 29 and moves with one of said blanks 4 into the folding mechanism in a position centrally below said blank and directly below the folding crease 5 of the blank shown in Fig. 15.

The carton moving means will next be described, inasmuch as a pair of such cartons must be positioned below the handle folding mechanism 28 before the handle folding operation is continued.

In Fig. 4 is seen a passageway 50 (in plan view) extending through the machine. In Fig. 2 the passageway is seen looking into the discharge end, and a pair of cartons is indicated in dot-dash line in Fig. 2 which cartons are seen, looking down from the top, in dot-dash line in Fig. 4.

One side of the pasageway 50 is defined by a pair of horizontally extending, vertically spaced rods 51, 52 while the right side is defined by similar rods 53, 54, with the rods 51, 53 uppermost. A stationary base plate 55 provides the bottom of the passageway. Rods 51—54 are slidably supported on brackets 55'.

Secured to each of the lowermost rods 52, 54 is a rack 56 with its teeth directed downwardly (Fig. 3) and below racks 56 is a shaft 57 that has a pair of pinions 58 secured thereto, each of which pinions has its teeth in mesh with the teeth of one of said racks.

The rods 51, 52 are secured together by a web 60 and a similar web connects rods 53, 54. Thus, upon rotation of shaft 57 in one direction or the other the rods and webs connecting them will move as a unit in one direction or the other according to the direction of rotation of shaft 57.

Rotation of shaft 57 is accomplished in substantially the same manner as the shaft 35 that carries pinion 35. A pinion 62 (Fig. 15) is secured on shaft 57. The teeth of pinion 62 are in mesh with the teeth of a rack 63, said rack having a cam follower 64 (Fig. 3) at its lower end that is in engagement with cam 65, which cam, in turn, is secured on shaft 40.

As seen in Fig. 3, the arrangement of racks 37, 63 is substantially the same, and a spring 66 (Fig. 2) reacting between a fixed bracket 67 and the upper end of the rack 37 constantly urges the cam follower 38 against cam 39, while a similar spring 67 (Fig. 15) urges the rack 63 downwardly so its follower 64 is against cam 65.

The cartons 3 (dot dash line) in Fig. 3 are moved simultaneously to the left, in the operation of the machine. In Fig. 14 is shown a plan and part sectional view of the right hand end of the carton feeding device. It has already been shown that, upon rotation of the cam shaft 40 the pairs of rods 51, 52 and 53, 54 will simultaneously be reciprocated longitudinally thereof, while the base 55 on which the cartons 3 are supported will remain stationary.

Secured to the left hand rods 51, 52 at the right hand end thereof as seen in Fig. 3 is a pusher member 67 (Fig. 14).

This pusher may be in the form of a housing having a flat, vertical front plate 68 that is adapted to engage one of the sides of a pair of cartons 3.

The right hand rods 53, 54 of Fig. 2 terminate at their rear ends short of the pusher 67 a sufficient distance to permit passage of cartons 3 therepast in a direction transversely of said rods to a position in front of the plate 68. Such cartons may be moved by any suitable means to said position from a conveyor or support 70 (Fig. 14).

Said front plate 68 is provided with a pair of movable elements 71, 72 that are spring urged to a position normally projecting from the forward face of said plate 68 so as to be in the path of travel of cartons 3 in their movement to a position adjacent to the face of plate 68. When two cartons are in position ahead of plate 68, and are ready for movement along passageway 50 both elements 71, 72 will be depressed, thereby closing the electrical circuit that energizes the motor 47 and causes the cycle of operation to commence. The said circuit includes such solenoid actuated switches and relays as are necessary to completion of each cycle, which commences with the pusher in retracted position ready for the positioning of a pair of cartons ahead of said plate 68.

Carried by the webs 60 that respectively connect each pair of rods 51, 52 and 53, 54 are pivotally mounted teeth-like members 73 (Fig. 4) arranged in opposed pairs. These teeth are relatively wide, vertically. Each is supported on a vertical pivot 74 that is disposed within the vertically projected confines of each pair of said rods, and a spring 75 urges the corresponding ends of each pair of opposed teeth toward each other and into passageway 50. As seen in Fig. 4, only the projecting ends of said teeth extend into said passageway and the pivoted ends of the teeth are the ends nearest the feed end of the device so that the slanted backs 76 will be directed generally toward the cartons that are at said feed end, while the end surfaces 77 of the teeth will face toward the discharge end of the carton feeding device.

The first forward movement of the pusher 67 will move the pair of cartons ahead of the same a sufficient distance along passageway 50 over base plate 55 to enable the set of teeth nearest the pusher to engage the cartons of said pair on the second stroke of the pusher. This pair will remain stationary on the stationary base plate upon return of the pusher to its initial starting position.

On the second stroke of the pusher, another pair of cartons will be moved forwardly ahead of the same, and the previously advanced pair of cartons will be moved to position B (Fig. 4) directly below the handle folding device 28. This corresponds to position B in Fig. 16. The next stroke of the pusher and the pairs of bars connected therewith will result in the pair of cartons at position B being moved to position C which corresponds to position C of Fig. 16, and the next stroke will move the pair of cartons to a position corresponding substantially to position D. Once the leading pair of cartons reaches position B (Fig. 3), each reciprocation of the pusher will result in a pair of cartons being positioned under the handle folding device.

Inasmuch as the pairs of bars defining the opposite sides of the passageway 50 are in almost sliding engagement with the oppositely outwardly facing sides of the pair of cartons, they are readily moved along said path by the reciprocable movement of the teeth 73 that move simultaneously with the pusher, and during the retracting stroke of the pusher bars and teeth 73, the latter swing to positions disposed wholly within the vertically projected confines between each of the pairs of pusher bars so as not to cause a retraction of the cartons. The latter are, of course, filled with liquid, such as milk, during their movement along passageway 50.

The action of the machine in delivering the cartons to station B has been described, and the action of the handle feeding mechanism in delivering a flat handle over position B has also been described.

In order to insure or facilitate the insertion of a folded handle between each of the pairs of cartons that successively reach position B, the base plate 55 (Fig. 4) is provided on its upper side with a central strip 79 that extends longitudinally of the passageway 50. This strip is triangular in cross sectional contour, and is feathered down at its ends to smoothly meet the upper surface of plate 55. The convergently upwardly extending sides of the strip are equal in width meeting at an obtuse apexial angle. As the cartons are moved to position B, the adjacent lower edges of each pair of cartons moves upwardly onto the upper sides of strip 79 (Fig. 12) thus tilting the upper ends of each pair of cartons apart at station B. Very little spacing is required between the upper ends of the cartons to enable the folded handle to slip between them. The angle of strip 12 as seen in Fig. 12 may be in excess of an angle sufficient to do the work satisfactorily.

In Figs. 6, 7, a flat horizontal blank 4 is indicated at position 80 in a position to be folded along the folding creases 5, 6 (Fig. 17). This folding mechanism (Fig. 6) comprises a pair of stationary plates 81 that are of the same shape and size, and which plates extend arcuately downwardly and toward each other from their upper edges which latter edges are horizontal and coplanar and are directed upwardly. The ends of each blank 4 outwardly of creases 6 rest on said upper edges of plates 81.

At their lower ends the lower edges of said plates 81 are in opposedly facing relationship spaced equally from opposite sides of a vertical plane bisecting the space between the upper edges of said plates 81 and extending through crease 5 of blank 4 longitudinally of said crease.

Above plates 81 are a pair of stationary opposedly positioned cam members 83 that extend vertically downwardly for a certain distance and that then curve toward each other at their lower end portions (Fig. 6).

Offset to one side of the pair of cam members 83 (Fig. 7) is a pair of folding blades 84 that are secured to the lower ends of similar arms 85, which arms are apertured adjacent to their upper ends for the ends of a cross head 86. Pivots 87 pivotally connect the ends of said cross head with the said arms for swinging of the blades 84 toward and away from each other.

The cross head 86 is rigid on the lower end of a vertically reciprocable rod 88, and above pivots 87 a spring connects upward extensions of said arms 85. Screws 89 threadedly extending through the upward extensions of arms 83 are adapted to engage the rod 86 and function for adjustably limiting the spacing between the upper ends of arms 85, and consequently the spacing between the lower edges of plates 84, as well as enabling the said lower edges to be equally spaced from a plane centrally between the upper edges of curved plates 81.

Cam followers 90 on arms 83 are adapted to engage the inner opposedly facing sides of the cam members 83.

When the blades 84 are elevated, as in Fig. 6, preparatory to folding blank 4 that is in position 80, the blades 84 extend convergently upwardly from their lower edges, and said lower edges are directly over and parallel with creases 6 at the ends of blank 4.

The cam 39 on cam shaft 40 is so formed and timed relative to other of said cams on said shaft that the projection 33 on the handle feed mechanism is directly below the central crease 5 in blank 4 when the rod 88 carrying said blades 84 commences its descent.

As the rod 88 moves downwardly, the lower edges of blades 84 engage the blank 4 along creases 6 and as the downward movement of said blades continues, the blank is bent along creases 5, 6 so that the marginal portions 7 at the ends of said blanks swing upwardly as the portions of the blank at opposite sides of the central crease 5 swing downwardly to opposite sides of the flat projection 33.

The cam followers 90 will be guided along the inner sides of the cam members 83 so that the lower edges of blades 84 will generally follow a path similar to the curve of the plates 81 but with sufficient space between them and the said plates to enable the marginal portions 7 to be folded backwardly as indicated in dot dash lines in Fig. 6.

The blades 84 continue their movement toward each other, folding the handle blank toward the sides of projection 33 until the lower edges of said blades are over the space between the lower edges of plates 81, when said projection 33 is withdrawn. Further downward movement of said blades 84 will cause them to move the handle 4 downwardly between the said lower edges of plates 84 and between the spaced upper ends of the cartons 1 that are at station B. The marginal portions 7 on said handle blank will spring apart as soon as they pass below the adjacent flanges 3 of said cartons, but will still be inclined upwardly as seen in the dot-dash line position in Fig. 6. The blades 84 will then commence their upward movement back to the full line starting position.

Vertical reciprocation of the rod 88 is effected through a lever arm 92 (Figs. 2, 6) that is pivotally connected at one end to said rod 88 and pivotally connected at 93 at its opposite end to a stationary part of the machine frame. A connecting rod 94 is pivotally connected at one end thereof at 95 to said lever 92 at a point spaced between the ends of said lever, and the opposite end of said rod 94 is pivotally connected to and between one end of a pair of short links 96 that in turn are pivotally connected to a stationary part of the machine. Links 96 carry cam follower 97 adjacent to the pivotal connection between rod 94 and said links 96, and which follower is in engagement with cam 98 on cam shaft 40. Upon rotation of said shaft 40, the rod 88 will be reciprocated as above-described.

The next step to be carried out is the securement of the collar blank around the upper ends of the cartons at station B, as already described in connection with Fig. 16.

The stack 13 of blanks indicated in Fig. 16 are adapted to be held in a magazine primarily comprising a pair of spaced, opposed, vertical channels 100 (Figs. 1, 2, 9, 10).

As seen in Fig. 10, the lower ends of these channels 100 are secured between a pair of opposed plates 101, 102 that extend between the lower ends of said channels. A base plate 103 is adapted to support the stack of collar blanks, and this base plate is supported at its ends in guides 104 (Fig. 9) for reciprocation transversely of its length.

Carried by base plate 103 is a feed strip 105 (Fig. 10) that extends longitudinally of plate 103 and projects above the latter about the thickness of one of the collar blanks. This feed strip 105 is normally below wall 101 at the start of a feeding operation, and the movement of the base plate 103 is such that the feed strip will move the lowermost collar strip from the stack and below wall 102 of the magazine for delivery to a position between a set of upper tracks 106 and a set of lower tracks 107 (Figs. 10, 11).

As seen in Fig. 9 the upper tracks are carried on a pair of arcuately downwardly extending brackets 108 that are secured at their upper ends to wall 102, while the lower tracks 107 are secured at their upper ends to a horizontal flat bar 110. Bar 110 has a pair of identical, depending arms 111 secured to its ends, which arms are secured at their lower ends to shaft 112, which shaft is rotatably supported on a stationary part of the machine.

The upper tracks 106 are in pairs, each pair being carried by one of the brackets 108 as seen in Fig. 11. A single lower track 107 (which is complementarily curved with respect to tracks 106) is disposed midway between each pair of upper tracks.

Extending through the tracks 106 are teeth 115 correspondingly spaced longitudinally of said tracks, with the spacing between the teeth on each track substantially equal to the width of a collar 13. These teeth are slanted at their ends so that a collar engaging tracks 106 will slide over them upon movement of such collar down the tracks, but the collar cannot be moved in the opposite direction as the high sides of the teeth prevent such movement.

Extending through the lower tracks are teeth 116 that are similar to teeth 115 and their outer ends are complementarily slanted reversely to the slant of the outer ends of teeth 115. The spacing of teeth 116 along tracks 107 is the same as the spacing of teeth 115 along tracks 106.

The tracks 107 and base plate 103 are secured together for simultaneous movement by means of spring straps 117. This permits simultaneous rotary movement of tracks 107 longitudinally thereof about the axis of shaft 112 and linear movement of base plate 103 in its guides 104.

Secured to shaft 112 (Fig. 2) is one end of an arm 118 and the other end of said arm is pivotally connected to one end of a connecting rod rod 119, the other end of which is pivotally connected to and between the upper ends of a pair of short arms 120 that in turn are pivoted to a stationary part of the machine at 121 at their opposite ends. Also carried by arms 120 at their upper ends is a cam follower 122 that is in engagement at all times with a cam 123 on shaft 40. A spring 124 connecting arm 118 with a stationary part of the machine will keep cam follower 122 in contact with cam 123.

By the foregoing structure it will be seen that rotation of shaft 40 will cause reciprocation of the base plate 103 and its feed strip 105 and at the same time the tracks 107 will be oscillated about the axis of shaft 112. The length of the stroke of the feed strip 105 is sufficient to move the lowermost collar 13 from below the stack that is in the magazine, and beyond the first pair of depending teeth 115, which first pair are carried in the lower edge of said wall 102 (Fig. 10). The remaining teeth 115 extend through tracks 106 as already described.

Upon return of the feed strip and tracks 107, the first pair of teeth 116 at the upper ends of tracks 107 will slide under the blank 13, that is held against retraction by the said first pair of teeth 115 and will engage the trailing edge of the collar 13 that was moved from below the stack. Therefore, the second movement of the tracks 107 and the feed strip 115 will result in a new collar being removed from the stack and below tracks 106 while the previously advanced collar is moved along to a new advanced position ahead of the next pair of teeth 115 on track 106. Thus the blanks will be successively moved from the stack and will intermittently be advanced to the lower ends of tracks 106, 107 until they fall in succession in a vertically disposed, horizontally extending position from the lower ends of the track onto supports 125 with the released collar in position alongside station B (Fig. 16) ready for folding about a pair of cartons at said station.

The next operation is one in which the upper ends of the cartons 1 at station B are moved tightly against the handle that has previously been inserted between them, and the collar 14 is wrapped around the upper ends of said pair of cartons, and the free overlapping ends of the collar are stapled together at the side opposite to the side at which the unfolded collar was delivered from tracks 106, 107.

The collar folding mechanism is illustrated in detail in Figs. 4, 5, and in Fig. 2 the stapling device is shown in full. The stapling device performs two functions, one being the stapling operation, and the other being a support to hold the pair of cartons at one side at their upper ends while a pusher at the opposite side of the pair pushes the upper ends of the cartons tightly against the handle.

In further explanation, the stapling mechanism in itself is conventional, but is carried on one end of an arm 130, while the opposite end of said arm is pivotally supported on a pivot 131 (Fig. 2) for swinging of said one end downwardly from an elevated position above the level of the pair of cartons at station B, to a position alongside the upper end of the carton of the pair at said station that is opposite to the collar feeding device. The stapler includes a blade 132 that is at the free end of arm 130, and which blade is adapted to lie flat against the upper side of the carton adjacent thereto when the stapler arm is in its lowermost position. This blade is spaced from the outer end of arm 130, and the conventional stapler in said outer end is adapted to drive a staple across the space between the said outer end of the arm 130 and to a conventional anvil carried by said blade for bending over the ends of the staple. A bracket arm 133 secures blade 132 in said spaced position with the space between the arm and blade free at its lower and lateral sides to permit the ends of the collar to be folded to overlapping position between said arm and anvil for stapling said ends of the collar together.

The arm 130 is hollow and one end of a link 135 is pivotally connected at 136 with the reciprocable mechanism (not shown) in the arm, and which is part of the ordinary stapler, for actuating said staples. The other end of link 135 is pivotally connected to one end of another link 137 and the opposite end of said link 137 is connected with pivot 131. The links 135, 137 are connected by a pivot 138 to which one end of a connecting rod 139 is also connected.

The arm 130 is held in elevated position through the connection between the links 135 and 137 and connecting rod 139 cam follower 140 on the lower end of rod 139 and a cam 141 on shaft 40, the links forming a toggle connection extending convergently upwardly from pivots 131 and 136 to the pivotal connection 138, with the stapler retracted.

Upon rotation of cam shaft 40 a predetermined distance, the arm 130 will be lowered until it engages a fixed stop 143, and at this point the lower end portion of blade 132 will be against the carton that is nearest thereto at station B, and in a position to permit the end portions 16 of the collar 13 to be folded to overlying position overlying said tip end portion. Further movement of the connecting rod downwardly will be effected by spring 144 that connects between an extension on pivot 138 and a fixed part of the frame therebelow (Fig. 2) and which spring also holds the cam follower against the cam 141 at all times. Such further movement will be controlled by the shape of cam 141, and as arm 130 will be held against such further movement, the latter will be a relative movement only, effecting reciprocation of pivot 136 that connects with the stapler mechanism for stapling the above described overlying ends of the collar 13 together. When arm 130 is lowered into engagement with stop 143, the blade 132 will be moved downwardly so that the overlying end portions of the collar will be fully backed by the blade during the stapling operation.

The stapling wire 145 is taken from a spool 146 and extends over a guide 147 and into the arm 130 to the stapling mechanism. The wire feed is old.

The foregoing description of the stapler is made before the mechanism for folding the collar because the blade of the stapler functions as a support against which the pair of cartons are held before the collar folding operation is completed.

Referring to Figs. 4 and 5, the collar folding mechanism comprises a pair of parallel, reciprocably supported, hollow rods 147 and 148. These rods are horizontally disposed and their ends that carry the collar engaging means are adjacent to the collar that is positioned at station B, and opposite to points along said collar that are just outwardly of the pair of folding creases 14. These are the folding creases that define the opposite ends of the central portion of the collar and which central portion is directly opposite the side of the milk carton that is nearest thereto.

Rods 147, 148 extend below the ends of a cross head 149 (Fig. 5) and this cross head, in turn, is pivotally attached at 150 (Fig. 2) to the upper end of an arm 151 that extends downwardly therefrom. The lower end of said arm is pivotally connected at 152 to one end of an arm 154 that is adjustable for length. The opposite end of arm 154 is pivotally connected at 155 to a fixed part of the machine.

A rod 156 is pivotally connected at one of its ends at 157 to arm 151 at a point intermediate the ends of said arm, and the opposite end of said rod is pivotally connected between a pair of short arms 158 that in turn is pivotally connected to a fixed part of the machine at 121. A cam follower 159 is secured between arms 158 adjacent to pivot 157, which follower is held in engagement with cam 160 (Fig. 3) on cam shaft 40 by means of a spring 172 which will subsequently be described.

Between rods 147, 148 is a third rod (Fig. 4) 164, said rod being secured to cross head 149 each of the three rods is supported horizontally in suitable bearings in said machine for reciprocation, bearings 165, 166 being at the ends of the rods 147, 148 that are adjacent to the cartons at station B and a similar bearing 167 supporting the rod 164. The opposite ends of said rods 147, 148 are supported in bearings 168, 169 in a fixed side wall 170 of part of the machine. Bearing 171 supports rod 164 in said side wall.

An expansion coil spring 172 around rod 164 reacts between a collar 173 secured on said rod and said wall 170 of the machine, tending to urge rod 164 toward the cartons at station B. However a pin 174 on bearing 167 extends through slot 175 and the degree that rod 164 can be moved under the influence of said spring 172 is limited by the closed end of said slot.

The end of rod 164 adjacent to the cartons at Station B has a pusher plate 176 rigid therewith, which plate is the same horizontal length as the width of the carton that is opposite thereto at station B, and the vertical width of the said plate 176 may be about equal to the width of a collar 14. This plate 176 will not only push the collar 14 at one side of station B against the carton that is adjacent thereto, but pushes the pair of cartons at said station tightly together against the handle that has been inserted between them. The blade 132 of the stapling device provides a rigid backing for said pair of cartons during the above step.

At the end of each rod 147 and 148 that is adjacent to the pusher plate 176 (at each side of said plate) is a shoe 177. These shoes are in opposedly facing relationship and are spring urged toward each other by a spring 178 (Fig. 4).

As seen in Fig. 4 within rod 147 (which is the lowermost rod looking at Fig. 4), is a bar 179 having a rack 180 that projects from the end of rod 147 that is adjacent to the shoe 177. This rod is surrounded by a spring 181 that reacts between a collar 182 secured within said rod and the rigid member 183 that carries shoe 177 and through which the rack extends. The end of rod 179 opposite rack 180 has a sleeve 184 secured thereto, which sleeve is normally in abutting relation to a socket member 185 coaxial therewith, and a spring 186 reacts between the end of rod 179 that is in sleeve 184 and the closed end of socket member 185. This socket member is reciprocable in a sleeve 187 that in turn is secured to sleeve 184.

The hollow rod 147 and the closed end of sleeve 187 are slotted at 188 at a point beyond the closed end of member 185 and said member is seated against a shoulder in sleeve 188 that spaces it from the closed end of slot 188.

Extending through the aligned slots in rod 147 and sleeve 187 is a pin 189 which projects upwardly from rod 147 and is secured to cross head 149. This pin is held against the closed end of slot 188 by a spring 191.

Spring 191 reacts between collar 192 secured on rod 147 and said pin 189.

The rod 148 has identically the same structure as rod 147, and as above described, except that the sleeve corresponding to sleeve 185 bears directly against the pin 189. The same numbers are used to identify parts associated with rod 148 that are identical with those parts associated with rod 147.

Each of the members 183 has a rack 180 extending therethrough, and on the outer end of each of said members is a pair of vertically spaced ears 195 between which is a pinion 196, the teeth of which are in mesh with those of the rack adjacent thereto; and also between each pair of said ears is a folding element 197 that includes spaced arms 198 extending at opposite sides of each pinion to the pinion shaft to which said arms are secured (Fig. 5). The arms and their connecting outer end from the folding member and normally said arms are perpendicular to the axis of the shaft carrying the same, or are at least substantially within the axially projected confines of the member 183 carrying said folding member. In Fig. 4, said folding members are shown as extending oppositely outwardly from the pinion shaft to which they are secured. Upon forward movement of the racks 180, these folding members will be caused to swing around toward each other and as the pinion shafts are offset relative to the axes of each rod 147, 148 toward each other, the folding elements will project toward each other and from the opposed sides of said rods when so swung.

In operation, assuming a collar 13 is in position alongside a pair of cartons, as in Fig. 16 and the rotation of cam 160 is such as to move the cross head 149 toward said cartons, the three rods 147, 148 and 164 will simultaneously move forward and cartons pusher 176 will press the collar against the pair of cartons, and will force the cartons against the handle therebetween and against the stapler blade 132 (which has just been moved downwardly so its end portion is against the carton adjacent thereto). The ears 195, being in a leading position on rods 147, 148 will bend the portions of collar 13 that are outwardly of folding creases 14 to positions extending across the oppositely outwardly facing sides of the pair of cartons 1, and then the shoes 177 will force said portions tightly against said sides as the rods move across the passageway 50 and generally toward the stapler.

The degree of movement of the collars 192 on rods 147, 148 is limited by the bearings 165, and 166, and upon said collars engaging said bearings, the folding devices will be at the folding creases 15 on the collar, or next to the end portions 16 of the latter. However, the cam 16 is so formed that the cross head 149 will continue its movement, with the result that pin 189 that bears directly against sleeve 185 in rod 148 will move said sleeve and the rack associated therewith relative to rod 148 and outwardly of the end of member 183 causing the folding member 197 to swing around and fold the end portion 16 of the collar that is adjacent thereto over the side of the carton that is against the stapler blade 132, and over the lower end portion of said blade.

Inasmuch as pin 189 in rod 147 must travel in slot 188 a short distance before it reaches sleeve 185, the folding member 197 on the latter rod will be delayed slightly, until the folding member on rod 148 has bent the one end 16 a sufficient distance to enable the other end portion to overlap it, and then, as soon as the folding member on rod 148 has completed its folding operation, the stapler blade 132 will move down to position the stapler anvil about centrally of the width of the overlapped end portions 16 and the rod 139 will pull the toggle links of the stapler down to actuate the stapler for stapling said overlapped ends together.

As soon as the above operation is completed, the stapler is withdrawn and the folding devices and pusher rod 164 are retracted, and the pair of cartons, now secured together with the handle between them, are moved to a station along passageway 50 corresponding to station C of Fig. 16. As already explained, at this station the tab or portion 10 of the handle still extends partially across the hand opening 9 in the handle. This should be bent through the opening to extend across the lower edge of the opening in the adjacent half of the handle, as seen at station C in Fig. 16.

To accomplish the above folding step, a rod 200 is supported alongside rod 147 for reciprocation in bearings 201, 202 that are like those supporting rod 147, except that bearing 201 which is adjacent to passageway 50, has a pin 203 thereon that projects through a slot 204 in rod 200.

Rod 200 also has a collar 205 secured thereon, and a spring 206 reacts between the collar and side wall 170 to tend to force the rod 200 across passageway 50. However, an arm 207 secured to cross head 149 (Fig. 5) holds the rod 200 back until the cross head is moved forwardly at which time spring 206 will move the rod 200 in the same direction.

On the end of rod 200 adjacent to passageway 50 is a folding element 206 that projects toward passageway 50, and this element is positioned so that it will engage and fold portion 10 on a handle at station C through the hand opening to the position shown in Fig. 16 at said station.

The action of this folding step occurs simultaneously with the collar folding operation on the oncoming pair of cartons that are at station B behind the pair at station C.

The degree of movement of rod 200 is determined by the length of slot 204 and said rod is retracted at the same time as rods 147 and 148 are retracted.

Only one step remains, and that is the folding of the handle against the top of one of the pair of cartons, as indicated at station D in Fig. 16, and this is accomplished by a folding plow or shoe 208 that is more or less conventional in itself in that it is a stationary blade disposed over the path of travel of the handle and is slanted to initially engage the upstanding handle and to bend it to one side and downwardly as the handle moves under said blade. After the above operation the cartons may be removed from the passageway 50 for storing or for shipment.

It is obvious from the foregoing that the steps of folding the portion 10 through the handle and of bending the handle downwardly are desirable but not absolutely essential, since the main job has been already done, namely; the securing of the collar and handle in position about the cartons.

The method itself, independently of the particular machine for performing it, may be said to comprise the insertion of the handle between a pair of cartons and the securing of said cartons against the handle and together against separation, at a point in the path of travel of said pair of cartons. The machine obviously is adapted to perform the above steps including the steps of securing the halves of the handle together and the folding of the handle to one side on top of one of the cartons of the pair.

We claim:

1. The method of packaging a pair of upstanding rectangular filled milk cartons having closed upper ends and flanges around said upper ends that comprises; supporting a pair of said cartons in side by side relationship for movement along a path of travel tilting one of said cartons from the vertical so that its upper end moves away from the upper end of said other carton, inserting the lower end of a handle between said upper ends at a point in said path, thereafter urging said upper ends against the handle so inserted and securing a collar horizontally around said upper ends for holding said cartons together and against the portion of the handle that is disposed between said upper ends.

2. The method of packaging a pair of upstanding rectangular filled milk cartons having closed upper ends and flanges around said upper ends that comprises; supporting a pair of said cartons in side by side relationship for movement along a path of travel tilting one of said cartons from the vertical so that its upper end moves away from the upper end of said other carton, inserting the lower end of a handle between said upper ends at a point in said path, thereafter urging said upper ends against the handle so inserted and securing a collar horizontally around said upper ends for holding said cartons together and against the portion of the handle that is disposed between said upper ends, and then bending the upper end of said handle to one side and over one carton of said pair.

3. The method of packaging a pair of upstanding rectangular filled milk cartons having closed upper ends and flanges around said upper ends that comprises; supporting a pair of said cartons in side by side relation and in engagement at their upper ends for movement along a path of travel, separating said upper ends at a point in said path, thrusting the lower end of a handle between said upper ends, and then moving said upper ends tightly against said lower end of said handle, and at substantially the same time wrapping a collar horizontally around said upper ends and securing the collar closed around said upper ends for holding said cartons together and against said lower end of said handle, 4. A machine for securing a carrier to a pair of milk cartons having closed upper ends and a flange around each such end comprising; a carton support for supporting said cartons in side by side relationship, a feed device for supporting a handle over the line of division between said cartons including a member supported for movement into engagement with a handle so supported above said line and toward said line for moving said handle to a position between said upper ends, means for actuating said member for said movement, relatively narrow strip feeding means for supporting a strip of cardboard adjacent to said upper ends, a strip folding device movable into engagement with said strip toward the lateral sides of the upper ends of said pair for wrapping said strip horizontally around said upper end with its ends in overlying relationship alongside a carton of said pair, means for so moving said strip folding device, means for securing said overlapping ends together.

5. A machine for securing a carrier to a pair of milk cartons having closed upper ends and a flange around each such end comprising; a carton support for supporting said cartons in side by side relationship, a feed device for supporting a handle over the line of division between said cartons including a member supported for movement into engagement with a handle so supported above said line and toward said line for moving said handle to a position between said upper ends, means for actuating said member for said movement, relatively narrow strip feeding means for supporting a strip of cardboard adjacent to said upper ends, a strip folding device movable into engagement with said strip toward the lateral sides of the upper ends of said pair for wrapping said strip horizontally around said upper end with its ends in overlying relationship alongside a carton of said pair, means for so moving said strip folding device, a stapling device alongside said pair of cartons positioned for engagement with said overlapped ends, and means for actuating said stapling device for stapling said ends together.

6. In a machine for securing a carrier to a pair of milk cartons having closed upper ends; a carton support for supporting said pair upright in side by side relationship, means for supporting a strip of cardboard horizontally with its central portion alongside a carton of said pair and with opposite end portions of said strip projecting oppositely away from said pair, folding devices adjacent to said support, means supporting said devices for movement into engagement with said end portions and alongside said pair of cartons for folding said strip horizontally against opposite sides of said pair and over the side of said pair opposite the central portion of said strip to overlapping relationship of the terminating ends of the strip, and a stapler positioned at said last mentioned side for stapling said overlapping ends together.

7. In a machine for securing a carrier to a pair of milk cartons having closed upper ends; a carton support for supporting said pair upright in side by side relationship, means for supporting a strip of cardboard horizontally with its central portion alongside a carton of said pair and with opposite end portions of said strip projecting oppositely away from said pair, folding devices adjacent to said support, means supporting said members for movement into engagement with said end portions and alongside said pair of cartons for folding said strips against opposite sides of said pair and over the side of said pair opposite the central portion of said strip to overlapping relationship of the terminating ends of the strip, and a stapler positioned at said last mentioned side for stapling said overlapping ends together, a pair of members respectively positioned for engagement with said central portion and with the side of said pair opposite said central portion movable relatively toward each other for urging said cartons together, one of said members being a portion of said stapler.

8. In a machine for securing a carrier to a pair of milk cartons having closed upper ends; a carton support for supporting said pair upright in side by side relationship, means for supporting a strip of cardboard horizontally with its central portion alongside a carton of said pair and with opposite end portions of said strip projecting oppositely away from said pair, folding devices adjacent to said support, means supporting said members for movement into engagement with said end portions and alongside said pair of cartons for folding said strips against opposite sides of said pair and over the side of said pair opposite the central portion of said strip to overlapping relationship of the terminating ends of the strip, and a stapler positioned at said last mentioned side for stapling said overlapping ends together, said folding devices each including fingers at their ends supported for swinging toward each other, and means for so swinging said fingers upon movement of said fingers to points at opposite edges of said last mentioned side for folding the terminating ends of said strip to said overlying relationship.

9. In a machine for securing a carrier to a pair of milk cartons having closed upper ends and flanges around said ends; a carton support for supporting said pair upright in side by side relationship and slightly spaced apart at their upper ends, a support above the space between such pair for supporting a flat handle thereover, means for engaging said handle and for moving the latter to a position extending partially between said upper ends and below the adjacent flanges at said upper ends, and a collar securing device including a pair of members at opposite sides of said pair movable relatively toward each other and into engagement with said upper ends of said cartons for moving said upper ends tightly against opposite sides of said handle, said device further including a collar forming mechanism for wrapping a collar around said upper ends upon movement of said upper ends together, and means for actuating said collar forming mechanism.

10. A machine for securing a carrier to a pair of rectangular milk cartons having closed upper ends comprising the combination of; carton support for supporting a plurality of such pairs upright in spaced relationship for movement of said spaced pairs along a path of travel in one direction; a handle forming device over said path for folding cardboard handle blanks on themselves to vertical position with the lower edges of the folded blanks over and aligned with the line of division between said pairs of cartons, means at a point on said path for moving successively folded handle blanks to between the upper ends of the cartons of each pair, a collar forming device alongside said path at said point for folding a strip of cardboard around each such pair at said point, means actuating said device for so folding a strip about each such pair, means for successively moving said pairs to and past said point in said path.

11. A machine for securing a carrier to a pair of rectangular milk cartons having closed upper ends comprising the combination of; carton support for supporting a plurality of such pairs upright in spaced relationship for movement of said spaced pairs along a path of travel in one direction; a handle forming device over said path for folding cardboard handle blanks on themselves to vertical position with the lower edges of the folded blanks over and aligned with the line of division between said pairs of cartons, means at a point on said path for moving successively folded handle blanks to between the upper ends of the cartons of each pair, a collar forming device alongside said path at said point for folding a strip of cardboard around each such pair at said point, means actuating said device for so folding a strip about each such pair, means for successively moving said pairs to and past said point in said path, carton engaging means at said point engageable with the sides of each pair of cartons opposite to their adjacent sides and movable toward each other for tightly forcing each pair of cartons together after the insertion of a handle blank therebetween, and means for so moving said carton engaging means.

12. A machine for securing a carrier to a pair of milk cartons having closed upper ends and flanges around said upper ends that comprises: means for supporting a pair of such cartons in side by side relationship for movement along a path of travel, means for inserting the lower end of a vertically disposed handle between the upper ends of such cartons at a point along said path, means for urging said upper ends into engagement with said lower end of said handle at a point along said path after said lower end has been so inserted and means for securing a collar horizontally around said upper ends for holding them against said lower end of said handle.

13. A machine for securing a carrier to a pair of upstanding vertically elongated milk cartons having closed upper ends and a flange around each such end comprising: means supporting said pair in side by side relationship for movement along a path of travel, a feed device for supporting a handle at a point along said path including a member mounted for movement into engagement with a handle so supported for moving such handle to a position between said upper ends, means for separating said cartons slightly adjacent their upper ends to permit insertion of said handle therebetween, means for folding a relatively narrow collar strip around said upper ends only of said cartons, means for urging said cartons into engaging relationship with said handle therebetween and means for securing the ends of said strip together to form a collar.

(References on following page)

References Cited in the file of this patent

UNITED STATES PATENTS

| | | |
|---|---|---|
| 361,548 | Richards | Apr. 19, 1887 |
| 1,968,172 | Renz | July 31, 1934 |
| 1,981,503 | Goeckeler | Nov. 20, 1934 |
| 2,109,527 | Fenton | Mar. 1, 1938 |
| 2,270,820 | Kaliska | Jan. 20, 1942 |
| 2,271,532 | Diehl | Feb. 3, 1942 |
| 2,276,129 | Wesselman | Mar. 10, 1942 |
| 2,351,596 | Brogden et al. | June 20, 1944 |
| 2,405,753 | Morgan | Aug. 13, 1946 |
| 2,415,218 | Rhodes et al. | Feb. 4, 1947 |
| 2,612,833 | MacChesney | Oct. 7, 1952 |
| 2,615,289 | Hickin | Oct. 28, 1952 |